United States Patent

Sievers et al.

[11] Patent Number: 6,086,039
[45] Date of Patent: Jul. 11, 2000

[54] HIGH-EFFICIENCY POPPET AND SEAT ASSEMBLY

[75] Inventors: Thomas J. Sievers, Upland; Mario Fregoso, Whittier, both of Calif.

[73] Assignee: Saint-Gobain Performance Plastics Corporation, Wayne, N.J.

[21] Appl. No.: 09/287,973

[22] Filed: Apr. 7, 1999

[51] Int. Cl.[7] .................................................. F16K 31/165
[52] U.S. Cl. ...................... 251/61.5; 251/63.5; 251/333
[58] Field of Search ................................... 251/331, 333, 251/335.2, 356, 359, 63.5, 61.5

[56] References Cited

U.S. PATENT DOCUMENTS

| 2,540,371 | 2/1951 | Jacobsen | 251/331 |
|---|---|---|---|
| 2,920,859 | 1/1960 | Holmes | 251/282 |
| 3,620,501 | 11/1971 | Friedell | 251/333 |
| 4,215,846 | 8/1980 | Ishizuka et al. | 251/298 |
| 4,783,047 | 11/1988 | Baltus et al. | 251/129.1 |
| 4,836,498 | 6/1989 | Heron et al. | 251/333 |
| 4,872,638 | 10/1989 | Thompson et al. | 251/54 |
| 4,905,960 | 3/1990 | Barnhart et al. | 251/129.18 |
| 5,011,113 | 4/1991 | Stobbs et al. | 251/129.16 |
| 5,178,366 | 1/1993 | Kojima et al. | 251/335 |
| 5,295,663 | 3/1994 | Machat et al. | 251/333 |
| 5,388,613 | 2/1995 | Kruger | 251/333 |
| 5,524,865 | 6/1996 | Uchisawa et al. | 251/331 |
| 5,779,224 | 7/1998 | Fukano et al. | 251/331 |

FOREIGN PATENT DOCUMENTS

| 2 599 110 | 11/1987 | France. | |
| 2 059 222 | 6/1972 | Germany. | |
| 25 25 243 | 12/1976 | Germany. | |
| 3024435 | 1/1982 | Germany | 251/129.17 |
| 4 194 466 | 7/1992 | Japan. | |

*Primary Examiner*—Kevin Shaver
*Assistant Examiner*—Eric Keasel
*Attorney, Agent, or Firm*—Christie, Parker & Hale, LLP

[57] ABSTRACT

A poppet and seat assembly comprises a poppet having a circular imperforate head portion at one poppet end and has an opposite end adapted for connection with a poppet actuator. The poppet head includes a valve seat interface surface along an outside head surface that tapers upwardly, moving radially outwardly from the head, at an angle in the range of from 8 to 25 degrees. The poppet includes a flange that extends radially around the head and that defines a terminal outside diameter edge of the poppet. The flange includes a tongue that projects axially away from the flange. A diaphragm extends radially around the poppet head and is interposed between the poppet head and the flange to enable poppet head movement relative to the flange. The poppet head, flange and diaphragm are all part of a one-piece construction. The assembly also comprises a circular poppet seat that is positioned adjacent to and opposite from the poppet. The seat has a poppet interface surface that tapers upwardly moving radially inwardly towards a radial axis of the seat in the range of from about 2 to 30 degrees. Together, the interacting poppet and seat surfaces are specifically designed to enable high efficiency actuation of the poppet vis-a-vis the seat to provided seating and unseating operation of the assembly. Additionally, the poppet and seat interface surfaces are cleanly swept and devoid of any surface features that could cause unwanted fluid hold up.

16 Claims, 2 Drawing Sheets

HIGH-EFFICIENCY POPPET AND SEAT ASSEMBLY

FIELD OF THE INVENTION

This invention relates to a poppet and seat assembly used in fluid and/or gas handling devices and, more particularly to a poppet and seat assembly that is specially configured to provide high-efficiency opening/unseated and closing/seated movement and eliminate any unwanted fluid entrapment when in the seated or closed position.

BACKGROUND OF THE INVENTION

Poppet and seat assemblies are commonly used in fluid or gas handling devices such as valves to regulate the passage of a liquid or gas from an inlet section of the device to an outlet section of the device. The poppet typically is actuated within the valve body to move towards a seat, that is configured to provide a leak-tight sealing interface with an adjacent surface of the poppet, to provide a seated-poppet state, and move away from such seat to provide an unseated state. Depending on how the valve body is configured internally, the poppet seated or unseated state could affect fluid flow through the valve.

Poppets are typically actuated within the valve body by use of a spring which can be operated by mechanical means, electrical means, pneumatic means, hydraulic means, or a combination thereof. The poppet actuator is designed to move the poppet in one direction or the other to achieve the desired seated or unseated poppet/seat state. The amount of force that is required to seat and unseat the poppet, thus achieving and removing a desired leak-tight seal within the valve body, is a function of many factors including the particular geometry of the seat and the poppet interface surface.

Poppet and seats assemblies known in the art, used in valve application, typically comprise a seat that has a flat or substantially planar poppet interface surface that is disposed around a fluid flow passage in a valve body. The poppet used with such seat oftentimes includes a seat interface surface that is planar so that it covers over the seat to provide a desired leak-tight fit when placed in a seated position. Alternatively, poppet and seat assemblies known in the art may be configured so that one or the other of the poppet or the seat have an angularly-oriented interface surface to again provide a desired leak-tight interface seal. The particular seat or poppet interface geometries of such known embodiments, however, are not configured to optimize the actuation of the poppet and seat assemblies, i.e., they do not facilitate low force poppet actuation to perform the seating/unseating operation.

Additionally, conventional poppet and seat geometries are not configured to minimize the occurrence of fluid hold-up adjacent the seat when the poppet is in a seated or unseated position. For example, conventional seats can be designed having a surrounding geometry that can act to retain or hold a volume of liquid therein. The fluid hold up can occur when the poppet and seat are seated and/or unseated, depending on the particular seat geometry. Such fluid hold up is not desired because as it can contribute to the buildup of unwanted contaminates, e.g, algae and the like when the fluid is water, within the fluid being transported.

It is, therefore, desired that a poppet and seat be constructed to provide seated and unseated operation within a fluid handling device using minimal spring force, i.e., have high-efficient actuation. It is also desired that such a poppet and seat be constructed to prevent unwanted fluid hold up when either in the seated or unseated position. It is desired that such poppet and seat provides high-efficiency actuation and zero fluid hold up while providing leak tight service that is equal to or that exceeds that provided from conventional poppet and seat assemblies.

SUMMARY OF THE INVENTION

A poppet and seat assembly, constructed according to principles of this invention, for use in a fluid handling device is designed having complementary interface surfaces that both provide high efficiency poppet actuation, and eliminate unwanted fluid hold up when either in the seated or unseated position. The assembly comprises a poppet having a circular imperforate head portion at one poppet end and has an opposite end adapted for connection with a poppet actuator. The poppet head includes a valve seat interface surface along an outside head surface that tapers upwardly, moving radially outwardly from the head, at an angle in the range of from 8 to 25 degrees. The poppet includes a flange that extends radially around the head and that defines a terminal outside diameter edge of the poppet. The flange includes a tongue that projects axially away from the flange. A diaphragm extends radially around the poppet head and is interposed between the poppet head and the flange to enable poppet head movement relative to the flange. The poppet head, flange and diaphragm are all part of a one-piece construction.

The assembly also comprises a circular poppet seat that is positioned adjacent to and opposite from the poppet. The seat has a poppet interface surface that tapers upwardly moving radially inwardly towards a radial axis of the seat in the range of from about 2 to 30 degrees. Together, the interacting poppet and seat surfaces are specifically designed to enable high efficiency actuation of the poppet vis-a-vis the seat to provide seating and unseating operation of the assembly. Additionally, the poppet and seat interface surfaces are clean swept and devoid of any surface features that could cause unwanted fluid hold up.

DESCRIPTION OF THE DRAWING

These and other features, aspects, and advantages of the present invention will be more fully understood when considered with respect to the following detailed description, appended claims, and accompanying figures:

DETAILED DESCRIPTION OF THE INVENTION

Poppet and seat assemblies constructed in accordance with the practice of this invention comprise a poppet having an angled seat interface surface that is specifically designed to interact with a seat raised poppet interface surface to provide a poppet and seat assembly that both facilitates high-efficiency actuation, and that is fully swept, i.e., that does not provide a fluid hold up volume.

Figure 1:
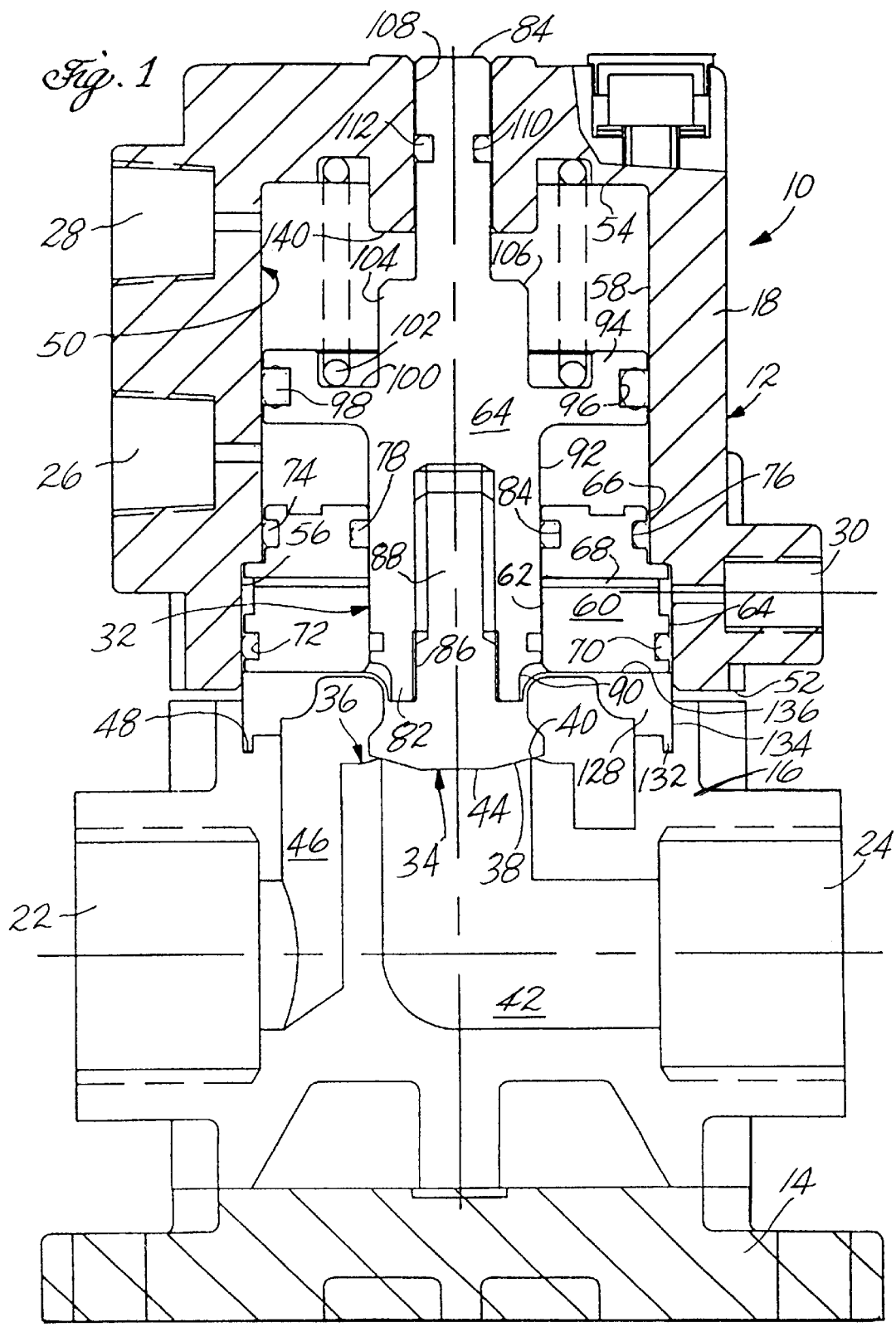
FIG. 1 is a cross-sectional side view of a diaphragm poppet and seat assembly of this invention embodied within a valve.

Referring to the FIG. 1, a fluid handling device in the configuration of a valve apparatus 10 is illustrated. The valve apparatus 10 is generally similar to that disclosed and illustrated in U.S. patent application No. 08/868,639 that is hereby incorporated herein by reference. The valve assembly 10 generally comprises a valve housing 12 made up of (moving from upwardly from the bottom portion of the figure) a base 14, a fluid transport housing (FTH) 16 disposed on top of the base 14, and a piston housing 18 disposed on top of the FTH 16. Screws or other suitable attachment means (not shown), extend through the piston body 18 and the FTH 16, and are threaded into the base 14 to attach the piston body and FTH 16 thereto.

The FTH 16 includes a fluid inlet port 22 through one of its sidewalls, and a fluid outlet port 24 through an opposite sidewall. In an air- or pneumatically-actuated embodiment of the valve apparatus 10, the piston housing 18 includes an inlet air port 26 and an air outlet port or vent 28 extending through its sidewall. The FTH 16 may also be configured having a leak detection port 30 extending through one of its sidewalls to monitor the occurrence of any fluid leakage within the valve apparatus.

A poppet assembly 32 is disposed within the piston housing 18 and includes a diaphragm poppet 34 attached to one of its ends. The diaphragm poppet 34 is designed to both interact with a valve seat 36 within the FTH 16, to control fluid flow therethrough upon actuation of the poppet assembly, and to provide a leak-tight seal with the FTH 16 to prevent the leakage of fluid to either the outside environment or to the piston housing 18. The diaphragm poppet 34 includes a seat interface surface 38 that is specifically designed to interface with an adjacent poppet interface portion 40 of the valve seat 36, which poppet interface portion is also specifically designed to interface with the poppet. The particular design features of the poppet and seat interface surfaces are described in better detail below.

The valve apparatus 10 comprises a pneumatically actuated poppet assembly. It is to be understood, however, that the design of the valve apparatus may be changed, while not varying from the spirit of the invention, to accommodate other means of poppet assembly actuation, e.g., mechanical, solenoid, hydraulic actuating means and the like.

The FTH 16 includes a fluid inlet passage 42 that extends from the fluid inlet port 22 axially upward through the FTH. The valve seat 36 extends circumferentially around an end of the fluid inlet passage 42. The valve seat poppet interface surface 40 is in the form of a lip, running circumferentially along an inside diameter of the valve seat, that projects in an upwardly angle moving inwardly towards the center of the valve seat. It is desired that the valve seat poppet interface surface 40 project upwardly at an angle in the range of from about 2 to 30 degrees relative to a horizontal plane running across the valve seat. A poppet interface surface having an upwardly projecting angle less than about 2 degrees is not desired because the valve seat does not provide a self-centering function, i.e., it does not center the poppet therein when the poppet is engaged within the seat. Thus the sealing engagement between the valve members is lost causing unwanted internal valve leakage. A poppet interface surface having an upwardly projecting angle greater than about 30 degrees is not desired because most of the spring force is wasted and, thus a stronger spring must be used to effect the same force on the seat. The use of a stronger spring is not desired as it also requires that the valve package size be increased. In an preferred embodiment, the poppet interface surface has an upwardly projecting angle of approximately 15 degrees.

The valve seat 36 and valve seat poppet interface surface 40 is also specifically designed so that it does not retain or entrap fluid that is placed in contact therewith. This is achieved by providing a surface across the valve seat that is free from surface artifacts, e.g., that does not include ridges, grooves, or the like, that could act to trap or retain fluid when the poppet is either seated there against or unseated. The configuration of the poppet interface surface 40, having a generally smooth raised surface prevents fluid that is placed in contact therewith from being retained or trapped against the surface. As will be discussed below, when the poppet 34 and seat 38 are placed in a seated position the interface contact between the two members is achieved along a thin ring area that is free or fluid retaining surface artifacts.

The diaphragm poppet seat interface surface 38 is specially designed to provide a high-efficiency actuation interface with the valve seat poppet interface surface 40. Poppet actuation efficiency is measured as the amount of force that is needed to displace the poppet within a valve to either seat the poppet with or unseat the poppet from the valve seat. Poppet actuation force measurements (both the radial and axial components) were modeled for poppet configurations having a number of different seat interface surface angles. It was discovered, contrary to expectations, that poppet valve seat interface surface angles of much less than 45 degrees provided highest poppet actuation efficiency. Conventional poppet design thought has been to configure the poppet with a seat interface surface having an angle of approximately 45 degrees., to theoretically optimize both the x or radial, and the y or axial, force components. Through careful analysis and modeling, it has been discovered that this conventional practice provides a poppet actuation efficiency that is only approximately 70 percent efficient. Applicant has discovered how to configure its poppet to provide a poppet actuation efficiency that is in the range of from 90 to 99 percent efficient, i.e., at least 28 percent more efficient than achieved using conventional poppet configurations.

The poppet seat interface surface 38 is designed having a particular angular orientation relative to a horizontal plane running along a nose 44 of the poppet. The poppet seat interface surface 38 projects downwardly moving radially inwardly from a side portion of the poppet to the poppet nose 44. It is desired that the poppet seat interface surface 38 have a downwardly projecting orientation in the range of from about 8 to 25 degrees. As mentioned above, it has been discovered that a seat interface surface configured having an angular orientation within this range will provide a poppet actuation efficiency that is in the range of from about 90 to 99 percent efficient. A seat interface surface 38 having a downwardly projecting angle less than about 8 degrees is not desired because the poppet will begin to lose its centering ability within the seat, thereby jeopardizing poppet and seat sealability. A seat interface surface having a downwardly projecting angle greater than about 25 degrees is not desired because the poppet actuation efficiency will be reduced below 90 percent, e.g., a poppet seat interface surface angle of 45 degrees produces a poppet having only a 70 percent actuation efficiency. In a preferred embodiment, the poppet interface surface has a downwardly projecting angle of approximately 16 degrees, as this provides a poppet actuation efficiency of approximately 96 percent without poppet centering problems.

Extending upwardly away from the valve seat 38 towards an end of the FTH facing the piston housing 18, the FTH 16 includes a fluid chamber 46 that is designed to route fluid past the valve seat 38, into the fluid inlet passage 42, and out of the FTH via the fluid outlet port 24. The FTH includes a groove 48 within the fluid chamber 46 that is disposed circumferentially around a peripheral edge of the chamber.

The groove 48 is designed to accommodate a complementary tongue projecting from a peripheral outside edge of the poppet 34, as will be described in better detail below, to provide a leak-tight seal against the FTH.

Attached to an end of the FTH 16 is the piston housing 18. The piston housing includes a piston chamber 50 that extends axially through the piston housing from an open end 52, that interfaces with the FTH, to an opposite closed end 54 of the piston housing. As mentioned above, the piston housing 18 includes, when adapted to provide pneumatically-actuated poppet assembly movement, an inlet air port 26 and an outlet air port 28 that each extend through a piston housing sidewall. Additionally, the piston housing can be configured to provide leak detection via a leak detection port 30 extending through its sidewall.

The piston chamber 50, in a preferred embodiment, has a circular radial cross section and includes both a first diameter section 56, that extends axially a distance from the open end 52, and a smaller second diameter section 58 that extends axially from the first diameter section 56 to the closed end 54 of the piston housing. The piston chamber 50 is constructed in this manner to accommodate non-movable or immobile placement of a piston gland 60 therein. The piston gland 60 is used in applications where an air-actuated poppet assembly 32 is desired to create an air-tight pressurizing chamber within the piston chamber. The piston gland 60 has a donut-shaped annular construction with a central opening 62 extending axially therethrough for accommodating placement of a poppet assembly piston 64 therein.

The gland 60 includes an outside wall surface having a first diameter section 64 that is sized for placement within the first diameter section 56 of the piston chamber, and a second diameter section 66 that is sized for placement within the second diameter section 58 of the piston chamber. When loaded into the open end 52 of the piston chamber 50, maximum axial placement of the gland therein is limited by the interaction between complementary shoulders formed in the piston chamber and the gland at the point where the respective chamber and gland first and second diameter sections meet. The gland 60 is sized axially so that, when loaded into the piston chamber, it does not extend beyond the open end 52.

In applications where leak detection is desired, the gland 60 includes a leak passage 68 extending radially therethrough from the central opening 62 to its first diameter section 58. When loaded within the piston chamber 50, the leak passage 68 is in fluid flow communication with an annular groove in the first diameter section 64, which groove is in fluid flow communication with the leak port 30 in the piston housing to facilitate fluid-flow into the leak port in the event that process fluid leaks past the fluid chamber 38 and into the piston chamber. Leak detection using a valve configured in this manner can be performed by using conventional leak detection means, such as by invasive and non-invasive leak sensors, or by visual indication.

The piston gland 60 includes one or more annular seals around its outside diameter surface to form a leak-tight seal with the adjacent piston chamber wall surface. In a preferred embodiment, the gland includes a first annular seal 70, that extends circumferentially around its first diameter section 64 and that is disposed within a groove 72, and a second annular seal 74 that extends circumferentially around its second diameter section 66 and that is disposed within a groove 76. The first and second annular seals 70 and 74 are positioned axially along the gland so that the leak passage 68 is interposed therebetween. The gland also includes a third annular seal 78 that extends circumferentially around the surface of the central opening 56 within a groove 80. The third annular seal 78 is positioned axially along the gland on the same side of the leak passage 68 as the second annular seal 70 to both prevent the passage of fluid leaking from the fluid chamber 46 beyond the gland and into the piston chamber, and to direct leaking fluid into the leak passage 68 for leak detection. The third annular seal 78 also forms an air-tight seal against the piston to provide air actuated piston movement. The first, second and third annular seals are preferably O-ring type seals formed from a material having desired properties of elasticity. Where chemical resistance is also desired, the O-ring seal may be made from copolymers of vinylidene fluoride and hexafluoropropylene or from other types of fluoroelastomeric materials.

The poppet assembly 32 is disposed axially within the piston chamber 50. The poppet assembly 32 comprises the piston 64, having a head portion 82 at one of its axial ends, a tail portion 84 at its opposite axial end, and the diaphragm poppet 34 attached to its head portion. The piston 64 is generally cylindrical in shape and includes a hollow passage 86 that extends a distance axially from the head portion 82 into the piston. The hollow passage 86 is configured to accommodate therein and provide attachment with a stem portion 88 of the poppet 34. The outside surface of the piston 64 has a first diameter 90 that extends axially a distance from the head portion, and a second diameter section 92 that is slightly larger than the first diameter section and that extends axially a distance therefrom. The second diameter section 92 of the piston 64 is sized to fit within the central opening 62 of the piston gland 60 so that a leak-tight seal is formed between the piston and the third annular seal 78. The reason why the piston first diameter section 90 is sized smaller than the piston second diameter section 92 will be explained below with reference to the poppet 34.

The piston 64 includes a flared section 94 that extends radially away from the second diameter section 92, and that has an outside diameter sized to fit within the piston chamber 50 second diameter section 58. The flared section 94 is positioned axially near the middle of the piston and includes a groove 96 disposed circumferentially around its outside surface that is positioned facing a wall surface of the piston chamber. An annular seal 98 is disposed within the groove and provides a leak-tight seal between the piston and the piston chamber. The annular seal 98 can be made from the same type of material described above for the first, second and third annular seals. A backside surface 100 of the flared section 94, i.e., the surface of the flared section directed axially toward the tail portion 84 of the piston, is adapted to accommodate placement of one end of a valve spring 102 thereon.

Moving axially away from the flared section 94 towards the tail portion 84, the piston includes a third diameter section 104 that extends axially a distance from the flared section 94 to the tail portion 84. The third diameter section 104 is sized to fit within the coils of the valve spring 102 to prevent binding with the spring when the poppet assembly is actuated. In a preferred embodiment, the piston third diameter section 102 is sized slightly smaller than the second diameter section 92. The tail portion 84 of the piston 80 extends axially a distance away from the third diameter section 104 to form an end of the piston. The tail portion 84 has a diameter sized smaller than that of the third diameter section 104, thereby forming a shoulder 106 at the transition point.

The piston 64 is loaded into the piston chamber 50 so that the tail portion 84 is disposed within an opening 108 through the closed end 54 of the piston housing 18. The tail portion includes a groove 110 that extends circumferentially around its outside surface, and an annular seal 112 that is disposed within the groove 110 to provide a leak-tight seal between the piston tail and the opening 108. The valve spring 102 is interposed between the closed end 54 of the piston housing 18 and the backside surface 100 of the piston flared section 94, and concentrically around both the third diameter section 104 and a portion of the piston tail portion 84. The poppet gland 60 is disposed around the piston so that a leak-tight seal is formed between the gland central opening 62 and the piston second diameter section 92.

Referring again to the poppet 34, the poppet stem 88 projects axially away from a backside surface of the head 38 and is adapted to provide an attachment fitting with the hollow passage 86 of the piston 64. In one embodiment, the poppet stem 88 is threaded to provide a threaded attachment with complementary threads within the hollow passage 86 of the piston. Alternatively, the poppet stem 88 can be configured to provide an interference snap fit or the like with a complementary hollow passage 86 of the piston head portion to provide attachment thereto.

If desired, for purposes of forming a piston having enhanced structural rigidity in the axial direction, the piston hollow passage 86 can be configured having a depth greater than the poppet stem 88 to accommodate placement of a piston insert (not shown) therein. The piston insert can be made from an inert material, such as a ceramic material and the like, that is capable of providing structural reinforcement to the piston. An example of when use of the piston insert would be desirable is where the valve apparatus is to be used in a high temperature or high pressure process fluid application, i.e., where enhanced piston rigidity would be desired.

Figure 2:
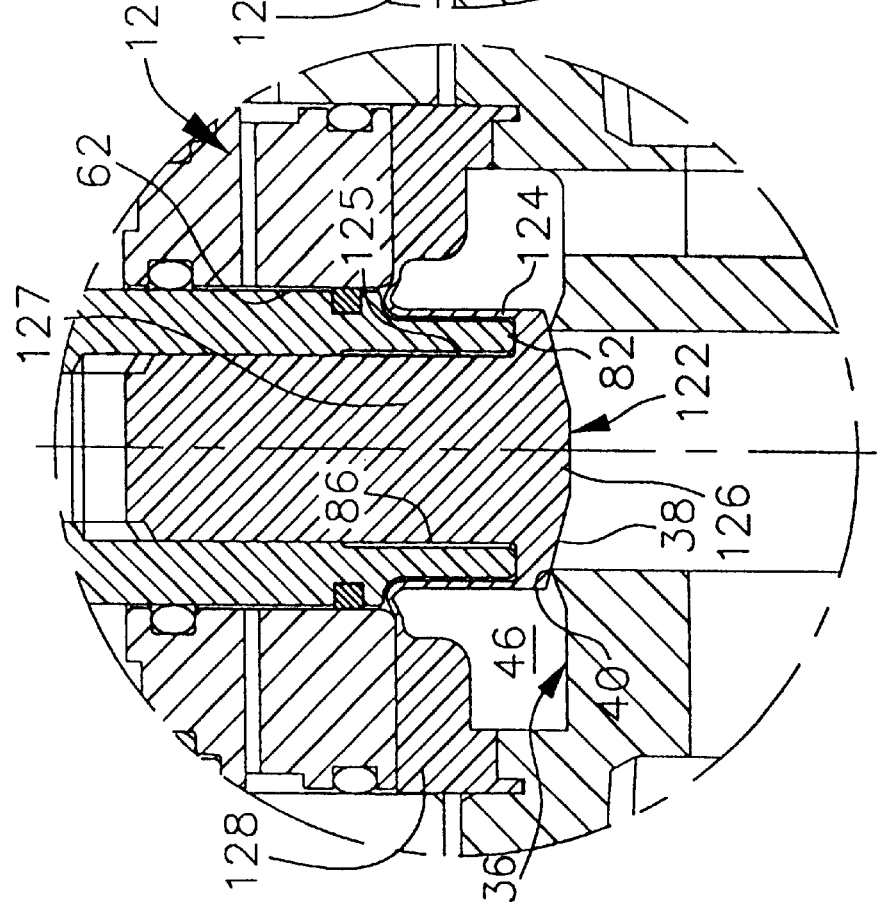
FIG. 2 is a cross-sectional side view of a rolling diaphragm poppet and seat assembly of this invention embodied within a valve in a closed or seated position.

FIG. 2 illustrates another embodiment of a valve apparatus 120, constructed according to principles of this invention, comprising a rolling diaphragm poppet 122 rather than the diaphragm poppet illustrated in FIG. 1. The rolling diaphragm poppet 122 is understood to have the same type of valve seat interface surface 38, and the valve seat 36 is understood to have the same type of poppet interface surface 40, as that described above and illustrated in FIG. 1 to provide both the desired high efficiency operation and fully swept surfaces. The rolling diaphragm poppet 122 comprises a sleeve 124 that is integral with a poppet head 126, and that extends axially away from the head to poppet flange 128. The sleeve 124 forms a cylindrical sidewall surface of the poppet that permits the poppet head 126 to move axially within the valve transport chamber 46 by rolling and unrolling action against the piston gland central opening 62.

A circular cavity 125 extends around the backside surface of the poppet head 126 between the poppet stem 127 and the sleeve 124 that both isolates the sleeve from the stem and that accommodates placement of the piston head portion 82 therein. The piston head portion 82 fits within and completely fills the cavity 125 when the poppet stem 127 is placed into and is attached with the piston hollow passage 86.

Important features of both types of diaphragm poppets is that they are formed as a one-piece imperforate construction. Such one-piece poppet construction is highly desirable because it minimizes the number of potential leak paths through the valve, thereby minimizing the potential for fluid leakage from the transport chamber 46 into the piston chamber 50. Conventional diaphragm-type valves typically include a valve stem that is placed through a hole or opening in the diaphragm. Such multi-piece construction provides an inherent leak path between the valve stem and the diaphragm through which process fluid can exit the valve. The one-piece construction of rolling diaphragm poppets of this invention eliminates this leak path, thereby reducing the possibility of unwanted fluid leakage through or from the valve.

The sleeve 124 is in the form of a continuous thin-wall structure that extends between the head 126 and the flange 128, and that permits the head to be displaced axially relative to the flange 128 via a rolling and unrolling movement of the sleeve in an axial direction. It is important to note that the sleeve has a non-bellowed configuration. Preferably, the sleeve is configured having a cylindrical or conical axial profile, i.e., having a constant or tapered diameter. It is also desired that the sleeve have a constant wall thickness. The sleeve facilitates axial poppet head movement by axially directed rolling movement not by an accordion type stacking movement that can be provided by a bellow-shaped sleeve. A key feature of this design, as will be discussed below, is that the sleeve is at all times supported along its inside surface by the piston and piston gland central opening, respectively. This particular poppet design provides poppet movement by a supported rolling and unrolling movement (where one surface of the diaphragm sleeve is supported at all times), rather than by elastic deformation, thereby minimizing the risk of rupture or other failure due to such elastic deformation. Such supported rolling action of the sleeve enables the poppet to function at higher process fluid temperatures and pressures than otherwise practical using conventional diaphragm-type valves.

Figure 3:
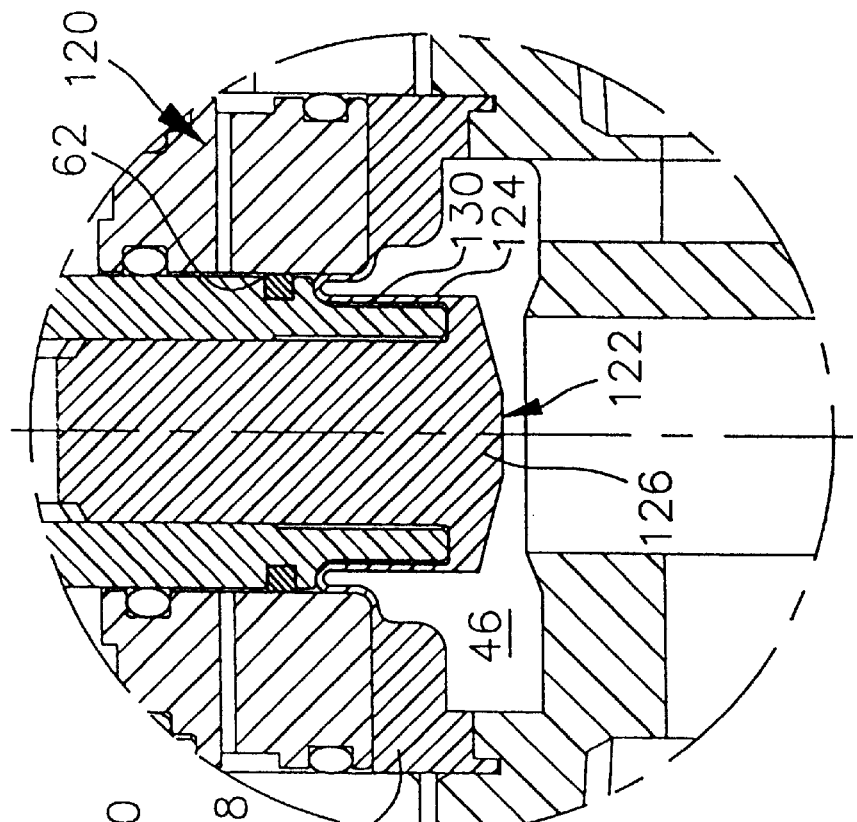
FIG. 3 is a cross-sectional side view of the rolling diaphragm poppet and seal assembly of FIG. 2 embodied within a valve in an open or unseated position.

FIG. 3 illustrates the valve apparatus 120, comprising the rolling diaphragm poppet 122 of FIG. 2, in an open position with the poppet 122 unseated from the valve seat. Upward movement of the poppet within the valve away from the valve seat is provided by the unrolling of the poppet sleeve 120 from an adjacent piston first diameter sidewall surface 130 onto a radially adjacent wall surface of the gland central opening 62.

The poppets described above for use in the valve apparatus illustrated in FIGS. 1 to 3 each comprise the flange 128 that extends circumferentially around the outside diameter of the poppet. Referring now to FIG. 1 for purposes of reference, the flange 128 provides an attachment structure between the FTH 16 and the piston housing 18 and, more specifically, between the FTH and the piston gland 60 for an air actuated valve embodiment. The flange 128 has a frontside surface that includes a tongue 132 that projects axially downwardly and that is sized to provide an interference fit within a groove 48 in the fluid chamber 46. A key feature of the poppet flange is that the tongue 128 is sized having a radial width and axial length that completely fills the groove 48 in the fluid chamber 46 to thereby both eliminate any fluid hold-up volume within the FTH, and to provide a leak-tight seal therebetween. Preferably, the tongue 132 has a stepped configuration to stabilize the placement of the flange 128 onto the FTH 16 when the poppet 34 is sandwiched between the piston housing 18 and FTH 16. The flange 128 has a planar outside diameter sidewall surface 134 that extends axially from the tongue 124 to a backside surface 136 of the flange, and that has a diameter sized to fit within both the FTH and the piston housing first diameter section 56.

The backside surface 136 of the poppet flange 128 is planar to provide a complementary surface for interfacing with an axial end of the piston gland 60, in the case of an air-actuated valve embodiment, or the piston housing.

In an example embodiment, such as that illustrated in FIGS. 2 and 3 comprising a rolling diaphragm poppet, a poppet 32 constructed to fit within a valve apparatus having a height of approximately 177 millimeters (as measured from the bottom of the base to the top of the piston housing) and a width of approximately 60 millimeters (as measured from the ends fluid inlet and outlet ports) has a flange 128 diameter of approximately 33 millimeters, a radial flange width of approximately 7 millimeters, an axial flange length of approximately 6 millimeters, a head diameter of approximately 14 millimeters, a sleeve 124 wall thickness of approximately 0.4 millimeters, a sleeve length of approximately 6 millimeters, a stem diameter of approximately 9 millimeters, a stem length of approximately 20 millimeters, and a radial cavity 127 width of approximately 2 millimeters.

Referring now to FIG. 1, for purposes of describing the general construction and operation of a valve apparatus of this invention, the poppet 32 is attached to the piston 64 after the piston and valve spring 102 are loaded into the piston housing 18, and after the piston gland 60 is disposed over the piston and is positioned into the piston chamber 50. The piston housing 18, comprising the poppet assembly 32, is then mounted onto the FTH 16 so that the poppet tongue 132 fits into the fluid chamber groove 48. The poppet assembly 32 is illustrated in a closed position with the poppet head 44 disposed with its valve seat interface surface 38 seated against the valve seat 34 poppet interface surface 40, preventing fluid within the fluid inlet pass passage 42 from entering the fluid chamber 46. The poppet assembly is maintained in such closed position due to the spring pressure acting thereon provided by the valve spring 102, i.e., the valve apparatus is constructed to provide normally-closed operation. Alternatively, the valve can be constructed with the valve spring 102 interposed between a frontside surface of the piston flared section and a backside surface of the gland 60 to provide a normally-opened operation.

As illustrated in FIG. 2, when the rolling diaphragm poppet 122 is in the closed or seated position, the poppet sleeve 124 is extended axially into the fluid chamber 46, and a wall surface of the piston head portion 82 supports an inside surface of the sleeve 124. The design of the head portion 82, to support the inside surface of the sleeve 124 when the poppet 122 is in the closed position, is a key design feature because it prevents the relatively thin sleeve from being deformed due to high process fluid operating pressures and/or temperatures.

Referring again to FIG. 1, when a sufficient amount of pneumatic pressure is routed to an air chamber 138 in the piston chamber between the piston flared section 94 and piston gland 60, via the inlet air port 26, to equalize and overcome the spring pressure provided by the valve spring 102, the piston 64 is displaced axially within the piston chamber 50 towards the closed end 54. The piston 64 is axially displaced within the piston chamber 50 until the piston shoulder 106 abuts against a ridge 140 that projects axially a distance from the piston housing closed end 48 towards the piston. As the piston moves axially within the piston chamber, air within the piston chamber that exists between the piston flared section 94 and the piston housing closed end 48 is displaced or vented therefrom via the air outlet port 28.

The axial displacement of the piston 64 within the piston chamber causes the poppet head 44 to disengage the valve seat 36, thereby allowing fluid within the fluid inlet passage 42 to enter the fluid chamber 46 and pass through the FTH 16 via the fluid outlet port 22. As shown in FIG. 3, axial displacement of the piston within the piston chamber also causes the poppet sleeve 124 to roll in an axial direction off of the piston and onto an adjacent concentric inside surface of the piston gland central opening 62.

To enable such rolling action and transfer of the sleeve between the adjacent valve surfaces, e.g., the piston and the piston gland opening, it is important that a sufficient clearance exists between the surfaces to accommodate a rolling diameter of the sleeve. For example, in a preferred valve apparatus embodiment as illustrated in FIG. 2, the piston first diameter sidewall surface 130 is sized smaller than the piston gland central opening 62 to provide a clearance therebetween of approximately 1.2 millimeter. Such clearance is sufficient to accommodate rolling of a poppet sleeve having a wall thickness of approximately 0.4 millimeters.

As mentioned above, key features of valve apparatus of this invention is: (1) the design of the poppet and valve seat having respective valve seat and poppet interface surfaces that are angularly oriented to provide high-efficiency poppet operation; the design of the poppet and seat interface surfaces to provide a fully swept surface to eliminate fluid hold up; (2) the design of a rolling diaphragm poppet that: (a) has a one-piece construction; (b) provides a leak-tight seal against the valve seat; (c) provides leak-tight seal with the FTH 16; and (d) permits a relatively long poppet stroke length by rolling axial movement without risking rupture or other type of deformation-related failure. Another desired feature of rolling poppets of this invention is that, due to both its design and material of construction, its use avoids the generation of particulate matter caused from the degradation of the movable portion (i.e., the sleeve).

An important feature of the rolling diaphragm poppet is its ability to permit a relatively long poppet stroke length within the fluid chamber while having a relatively small poppet diameter. Conventional diaphragm-type valves require that a larger diameter diaphragm be used in order to achieve an increased poppet or valve stem stroke length. This is so due to the need to control the amount of diaphragm deformation during valve stem actuation to minimize the possibility of diaphragm rupture. Since the poppet of this invention allows poppet movement by an axially directed rolling of the sleeve, rather than by diaphragm deformation, it can be adapted to accommodate a long stroke length by varying the axial length of the poppet sleeve without increasing the poppet diameter. This design feature allows valves incorporating such poppet to be constructed having a more compact size than otherwise possible using conventional diaphragm technology.

It is to be understood that diaphragm poppets, valve seats, and valve apparatus comprising the same, as constructed in accordance with the principles of this invention of this invention can be embodied differently than that specifically described above and as illustrated in FIGS. 1 to 3. For example, poppets and valve seats of this invention may be used in fluid flow control valves that are manually actuated or actuated by solenoid operation. In such embodiments, the piston housing may be designed differently that illustrated in FIG. 1. For example, in such non air-actuated embodiments the piston chamber does not include the piston gland (since there would be no need to create or have an air chamber), and the piston may not have the flared section (since there would be no need to create or have an air-tight seal within the piston chamber). In such embodiment, the piston chamber would: (1) have an inside diameter sized slightly larger than the piston to accommodate its placement therein; (2) provide support for the poppet sleeve (e.g., when using a rolling diaphragm) when the poppet is moved into the open position; and (3) abut against the backside surface of the poppet flange.

Poppets and valve seats constructed according to this invention can also be used in fluid handling apparatus other than valves. For example, diaphragm poppets and valve seats of this invention may be used in the construction of needle or plug valves that are designed to provide precise control over fluid delivery.

Poppets, valve seats and valve apparatus constructed according to principles of this invention are well suited for use in transporting and regulating the flow of all types of fluids. A particular application for such valve apparatus is to control the flow rate of process chemicals that are used, for example, in the semiconductor industry. In such applications, it is desired that the FTH, and poppet, i.e., the wetted valve members, preferably be made from a material that displays good chemical and thermal resistance properties. Such properties are desirable if the valve apparatus is to be used in the semiconductor manufacturing industry or in any other industry where corrosive chemicals are to be passed through the valve or where it is desirable that a high degree of chemical purity of the process chemical passed through the valve be maintained. In the semiconductor manufacturing industry, highly corrosive process chemicals such as strong inorganic acids, strong inorganic bases, strong solvents, and peroxides are used during the etching operation and are oftentimes heated to enhance the etching action of the chemicals, and thus enhance the efficiency of the etching operation. It is, therefore, important that the valve and poppet contained therein to control the flow of such process chemicals be both chemically and thermally resistant to provide dependable operation without the potential for valve failure, which may result in leakage of the corrosive chemicals and associated vapors from the valve, where it could cause a hazard to the to the environment and/or a danger to nearby operators.

Additionally, it is important that the valve be chemically resistant so that it will not degrade upon contact with the process chemicals and introduce contamination into chemically pure process liquids. The introduction of such contaminants may cause hundreds of thousands of dollars of damage to a batch of semiconductors undergoing treatment with such process chemicals.

In such application, it is desired that the FTH and poppet be constructed from a fluoropolymer compound selected from the group of fluoropolymers including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred material is Teflon® PFA or Teflon® PTFE, which are provided by DuPont Company of Wilmington, Del. Such materials are not damaged by corrosive, acidic, or caustic liquids and do not introduce contamination into chemically pure liquids. The non-wetted valve members, e.g., the piston housing and piston, can be made from any suitable structural material. Since these valve members are not wetted by the process fluid they can be made from such plastics as polypropylene and the like that can provide a suitable degree of structural rigidity for the particular application. Where properties of chemical resistance are desired for the entire valve, the non-wetted members can be formed from the same fluoropolymers described above, wherein a preferred chemically resistant material for the piston housing and piston is Tefzel® ETFE from DuPont.

Each of the valve members comprising the FTH, piston housing, piston and poppet, can be formed by either mold or machine process, depending on both the type of material that is chosen and the project budget. For example, in a preferred embodiment the poppet is formed from Teflon® PTFE by a machine process due to the nature of the selected material. Teflon® PTFE is a preferred material for the poppet because of its superior anti-fatigue characteristics. However, the rolling diaphragm poppet can also be made from Teflon® PFA, in which case it would be formed by molding process due to the different characteristics of this material.

Valve apparatus comprising the poppet and seat constructions as illustrated in FIGS. 1 to 3 can be used to reliably operate to control the distribution of either fluid or gas through the FTH at temperature conditions of up to about 180° C., and pressure conditions of up to about 150 psig at an ambient temperature of about 25° C. or above.

Accordingly, it is to be understood that, within the scope of the appended claims, diaphragm poppets, valve seats, and valve apparatus comprising the same constructed according to principles of this invention may be embodied other than as specifically described herein.

What is claimed is:

1. A poppet and seat assembly for use in a fluid handling device comprising:
 a poppet comprising:
  a circular imperforate head portion at one poppet end and having an opposite end adapted for connection with a poppet actuator;
  a valve seat interface surface along an outside surface of the head that tapers upwardly moving radially outwardly from the head at an angle in the range of from 8 to 25 degrees;
  a flange extending radially around the poppet head and defining a terminal outside diameter edge of the poppet, the flange including a tongue that projects axially away from the flange; and
  a diaphragm extending radially around the poppet head and interposed between
 the poppet head and the flange to enable poppet head movement relative to the flange,
 the head, flange and diaphragm being a one-piece construction;
 a circular poppet seat positioned adjacent the poppet, the seat having a poppet interface surface that tapers upwardly moving radially inwardly towards a radial axis of the seat in the range of from about 2 to 30 degrees;
 wherein actuation of the poppet causes the poppet to move towards the seat to form a leak-tight seal between the poppet seat interface surface and the valve poppet interface surface.

2. The assembly as recited in claim 1 wherein the diaphragm is in the form of a sleeve extending axially away from the poppet head towards the poppet flange, the sleeve having a length that is greater than the radial distance between the poppet head and the poppet flange to enable poppet movement by rolling and unrolling action.

3. The assembly as recited in claim 1 wherein the poppet seat has an artifact-free surface to prevent fluid hold up.

4. A valve apparatus comprising the poppet and seat assembly recited in claim 1, wherein the valve comprises:
 a fluid transport housing having a fluid chamber disposed therein, the circular valve seat being positioned across a section thereof;
 a piston housing connected with the fluid transport housing and having a piston chamber; and
 a piston disposed within the piston chamber, the poppet being attached to an end of the piston and being disposed within the fluid chamber so that the poppet head interacts with the valve seat to control fluid flow therebetween, wherein the poppet flange is interposed between the fluid transport housing and the piston housing, and wherein the flange tongue is disposed within a fluid transport housing groove that extends concentrically around the valve seat to provide a leak-tight seal therebetween.

5. The apparatus as recited in claim 4 wherein the diaphragm comprises a sleeve that extends axially away from the head and that has a thin-wall construction, the sleeve having an axial length that is at least twice the radial distance between the poppet head and flange, the sleeve having an inside surface and an outside surface that rolls against a respective adjacent surface of the piston and the valve during poppet movement within the valve.

6. The assembly as recited in claim 1 wherein the poppet is formed from a fluoropolymeric material.

7. A poppet for use in a fluid transport apparatus comprising:

an imperforate head having a circular radial cross section;

a diaphragm extending radially away from a peripheral edge of the head, wherein the diaphragm that is adapted to enable poppet axial movement; and a flange that extends radially away from the diaphragm and that is adapted to provide a leak-tight fitting against an adjacent fluid handing apparatus surface, the head, diaphragm, and flanging being a one-piece construction;

wherein the diaphragm is a sleeve that extends axially between the poppet head and the flange a distance that is at least two times the radial distance therebetween, the sleeve having a constant wall thickness and having a constant diameter;

wherein the head includes a valve seat interface surface along an axial end that tapers upwardly moving radially outwardly from the head at an angle in the range of from 8 to 25 degrees.

8. The poppet as recited in claim 7 further comprising:

means for attaching the poppet to an actuating piston, said means projecting axially away from a backside surface of the head; and an annular cavity disposed between the sleeve and the means for attaching for accommodating placement of a piston end therein for supporting an inside surface of the sleeve.

9. The poppet as recited in claim 7 wherein the flange includes a tongue that is adapted to fit within a complementary groove in a fluid handling apparatus surface to provide a leak-tight fit therewith.

10. A circular valve seat for use with the poppet as recited in claim 7, the valve seat including a poppet interface surface that includes a lip that is tapered upwardly moving radially towards a radial axis of the seal.

11. The poppet as recited in claim 10 wherein the poppet interface surface lip is tapered upwardly in the range of from 2 to 30 degrees.

12. A valve apparatus for controlling fluid flow comprising:

a valve body having a central chamber that extends axially therethrough, the chamber including a fluid transport passage, and a fluid inlet and outlet at opposite ends of the passage, the valve body further comprising a valve seat positioned within the fluid transport passage;

a poppet that is disposed within the chamber and that is attached at one end to a piston that is axially displacable within the chamber, wherein the poppet has a one-piece construction and comprises:

an imperforate head having a circular radial cross section and having a seat interface surface along an axial end of the head that is tapered upwardly moving radially away from the head in the range of from about 8 to 25 degrees to interface with the valve seat to control fluid flow through the valve;

a diaphragm extending away from a peripheral edge of the head; and a flange extending radially from the diaphragm to define a peripheral edge of the poppet, the flange including means for providing a leak-tight seal with the valve body;

wherein the diaphragm is a sleeve that extends axially away from the head and has an axial length that is at least two times the radial distance between the poppet head and the flange, the sleeve facilitating axial displacement of the head within the chamber relative to the flange.

13. The apparatus as recited in claim 12 wherein the sleeve has a thin-wall construction and a continuous diameter, the sleeve has an inside wall surface and an outside wall surface, wherein the inside wall surface is positioned against a portion of the poppet when the poppet is placed in a seated position with the valve seat, and wherein the outside wall surface is positioned against a portion of the valve when the poppet is placed in an unseated position.

14. The apparatus as recited in claim 12 wherein the poppet further comprises:

means for attaching the poppet to a piston, said means projecting axially from a backside surface of the head; and an annular cavity interposed between the means for attaching and the sleeve, the cavity extending axially along the sleeve and being adapted to accommodating placement of a piston end therein to provide radial support to the sleeve.

15. The apparatus as recited in claim 12 wherein the means for providing a leak-tight seal with the valve body is a tongue that extends circumferentially therearound and that projects axially therefrom, and that is disposed within a complementary groove of the valve body.

16. The apparatus as recited in claim 12 wherein the poppet is formed from a fluoropolymeric material.

* * * * *

UNITED STATES PATENT AND TRADEMARK OFFICE
CERTIFICATE OF CORRECTION

PATENT NO. : 6,086,039
DATED : July 11, 2000
INVENTOR(S) : Thomas J. Sievers and Mario Fregoso It is certified that error appears in the above-identified patent and that said Letters Patent is hereby corrected as shown below:

Column 12,
Line 24, after "head" delete "portion".
Line 42, replace "a circular poppet seat" with -- a circular valve seat --.
Lines 49-50, replace "the poppet seat interface surface and the valve poppet interface surface." with -- the tapered interface surface of the poppet and the tapered interface surface of the valve seat. --.
Lines 52-56, claim 2 should read:
-- The assembly as recited in claim 1 wherein the diaphragm has a thin-wall construction extending axially away from the poppet head towards the poppet flange, the diaphragm having an axial length that is greater than the radial distance between the poppet head and the poppet flange to enable poppet movement by rolling and unrolling action of the diaphragm. --.
Line 59, replace "wherein the valve comprises" with -- wherein the valve seat is disposed within a fluid handling valve comprising: --.

Column 13,
Line 3, replace "the sleeve having" with -- the diaphragm having --.
Line 10, after "diaphragm" delete "comprises a sleeve that".
Lines 11 and 13, replace "sleeve" with -- diaphragm -- (both occurrences).
Line 23, after "wherein the diaphragm" delete "that".
Line 29, replace "flanging" with -- flange --.
Line 31, after "diaphragm" delete -- is a sleeve that --.
Lines 45 and 48, replace "sleeve" with -- diaphragm -- (both occurrences).
Line 57, replace "The poppet" with -- The valve seat --.

Column 14,
Line 11, change "displacable" to -- displaceable --.
Line 15, replace "having a seat" with -- having a valve seat --.
Line 26, replace "diaphragm is a sleeve that" with -- diaphragm has a thin-wall construction that --.
Line 29, replace "sleeve" with -- diaphragm --.
Lines 32-34, replace "wherein the sleeve has a thin-wall construction and a continuous diameter, the sleeve has" with -- wherein the diaphragm has a continuous diameter, --.

UNITED STATES PATENT AND TRADEMARK OFFICE
CERTIFICATE OF CORRECTION

PATENT NO.   : 6,086,039
DATED        : July 11, 2000
INVENTOR(S)  : Thomas J. Sievers and Mario Fregoso It is certified that error appears in the above-identified patent and that said Letters Patent is hereby corrected as shown below:

Column 14, contd.
Lines 46-49, replace "an annular cavity interposed between the means for attaching and the sleeve, the cavity extending axially along the sleeve and being adapted to accommodating placement of a piston end therein to provide radial support to the sleeve." with
-- an annular cavity interposed between the means for attaching the diaphragm, the cavity extending axially along the diaphragm and being adapted to accommodating placement of a piston end therein to provide radial support to the diaphragm. --.

Signed and Sealed this

Twenty-third Day of April, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.     : 6,086,039
DATED          : July 11, 2000
INVENTOR(S)    : Thomas J. Sievers and Mario Fregoso It is certified that error appears in the above-identified patent and that said Letters Patent is hereby corrected as shown below:

Column 12,
Line 24, after "head" delete "portion".
Line 42, replace "a circular poppet seat" with -- a circular valve seat --.
Lines 49-50, replace "the poppet seat interface surface and the valve poppet interface surface." with -- the tapered interface surface of the poppet and the tapered interface surface of the valve seat. --.
Lines 52-56, claim 2 should read -- The assembly as recited in claim 1 wherein the diaphragm has a thin-wall construction extending axially away from the poppet head towards the poppet flange, the diaphragm having an axial length that is greater than the radial distance between the poppet head and the poppet flange to enable poppet movement by rolling and unrolling action of the diaphragm. --.
Line 59, replace "wherein the valve comprises" with -- wherein the valve seat is disposed within a fluid handling valve comprising: --.

Column 13,
Line 10, after "diaphragm" delete "comprises a sleeve that".
Lines 11 and 13, replace "sleeve" with diaphragm -- (both occurrences).
Line 23, after "wherein the diaphragm" delete "that".
Line 29, replace "flanging" with -- flange --.
Line 31, after "diaphragm" delete -- is a sleeve that --.
Line 34, replace "the sleeve having" with -- the diaphragm having --.
Lines 45 and 48, replace "sleeve" with -- diaphragm -- (both occurrences).
Line 57, replace "The poppet" with -- The valve seat --.

Column 14,
Line 11, change "displacable" to -- displaceable --.
Line 15, replace "having a seat" with -- having a valve seat --.
Line 26, replace "diaphragm is a sleeve that" with -- diaphragm has a thin-wall construction that --.
Line 29, replace "sleeve" with -- diaphragm --.
Lines 32-34, replace "wherein the sleeve has a thin-wall construction and a continuous diameter, the sleeve has" with -- wherein the diaphragm has a continuous diameter, --.

UNITED STATES PATENT AND TRADEMARK OFFICE
CERTIFICATE OF CORRECTION

PATENT NO. : 6,086,039
DATED : July 11, 2000
INVENTOR(S) : Thomas J. Sievers and Mario Fregoso It is certified that error appears in the above-identified patent and that said Letters Patent is hereby corrected as shown below:

Column 14, cont'd,
Lines 46-49, replace "an annular cavity interposed between the means for attaching and the sleeve, the cavity extending axially along the sleeve and being adapted to accommodating placement of a piston end therein to provide radial support to the sleeve." with -- an annular cavity interposed between the means for attaching the diaphragm, the cavity extending axially along the diaphragm and being adapted to accommodating placement of a piston end therein to provide radial support to the diaphragm. --.

Signed and Sealed this

Ninth Day of September, 2003

JAMES E. ROGAN
*Director of the United States Patent and Trademark Office*